United States Patent
Baker et al.

(10) Patent No.: US 6,317,597 B1
(45) Date of Patent: Nov. 13, 2001

(54) METHODS AND SYSTEM FOR GEOGRAPHICALLY SELECTING DATA MODEMS FOR DATA SESSIONS OVER A WIRELESS CHANNEL

(75) Inventors: Jennifer Baker, Park City; John F. Major, Salt Lake City, both of UT (US)

(73) Assignee: 3Com Corp, CA (US)

( * ) Notice: Subject to any disclaimer, the term of this patent is extended or adjusted under 35 U.S.C. 154(b) by 0 days.

(21) Appl. No.: 09/404,935

(22) Filed: Sep. 24, 1999

(51) Int. Cl.$^7$ ..................................................... H04Q 7/20
(52) U.S. Cl. ..................... 455/426; 455/414; 455/445; 455/552; 455/556; 455/557; 379/201; 379/207; 379/211; 379/221
(58) Field of Search ........................................ 455/414, 417, 455/466, 428, 403, 406, 407, 412, 415, 423, 445, 456, 457, 460, 461, 422, 424, 418, 458, 556, 557, 552; 379/210, 211, 221, 201, 207

(56) References Cited

U.S. PATENT DOCUMENTS

| | | | |
|---|---|---|---|
| 5,210,530 | * 5/1993 | Kammerer et al. | 340/825.08 |
| 5,216,703 | * 6/1993 | Roy | 455/417 |
| 5,513,247 | * 4/1996 | Mukerjee et al. | 379/60 |
| 5,513,254 | * 4/1996 | Markowitz | 379/100.17 |
| 5,515,423 | 5/1996 | Beck et al. . | |
| 5,600,704 | * 2/1997 | Ahlberg et al. | 455/445 |
| 5,712,977 | 1/1998 | Glad et al. . | |
| 5,991,377 | * 11/1999 | Malik | 379/114 |
| 5,995,606 | * 11/1999 | Civanlar et al. | 379/201 |
| 6,038,227 | * 3/2000 | Farris et al. | 370/354 |
| 6,084,956 | * 7/2000 | Turner et al. | 379/230 |
| 6,115,460 | * 9/2000 | Crowe et al. | 379/211 |
| 6,122,501 | * 9/2000 | Gallant | 455/414 |
| 6,175,618 | * 1/2001 | Shah et al. | 379/201 |
| 6,215,790 | * 4/2001 | Voit et al. | 370/401 |

OTHER PUBLICATIONS

INSIDE WINDOWS® 95, Jim Boyce et al., *Understanding Dial–Up Networking*, Part VI, Chapter 33, p. 880, 1995.

* cited by examiner

Primary Examiner—Daniel Hunter
Assistant Examiner—Yemane Woldetatios

(57) ABSTRACT

Methods and computer readable media are provided for creating a wireless dialing string. Wireless dialing strings are used in a dial-up session to establish a communications link for transferring data between computing configurations from an origination location across a wireless network to a destination location. In a preferred embodiment, queries are made regarding the origination location and the wireless service provider. In response thereto, a database is searched for phone dialing codes, such as enhanced services modem pool availability codes and wireless digital data transfer protocol codes, that correspond to the origination information. The codes are then fashioned into the dialing string. Preferably, a dial-up manager serves to provide the functions of querying about the origination location, billing information, and preferred wireless service provider; searching the database; and fashioning the dialing string. It is a feature of this invention that the dial-up manager also monitor the actual dialing of the dialing string to determine whether a communications link between the origination and destination locations is ever established. In the event that the link is not established, troubleshooting assistance is provided to enable the eventual establishment of the dial-up session.

24 Claims, 3 Drawing Sheets

METHODS AND SYSTEM FOR GEOGRAPHICALLY SELECTING DATA MODEMS FOR DATA SESSIONS OVER A WIRELESS CHANNEL

BACKGROUND OF THE INVENTION

1. The Field of the Invention

The present invention relates generally to dial-up sessions for transferring data across a wireless network between computing configurations. More specifically, the present invention relates to methods and computer executable instructions for creating numeric dialing strings facilitating the wireless network dial-up session. Even more specifically, the present invention relates to creating dialing strings useful when calling and transferring data across a cellular wireless network in which enhanced services cellular modem pools are available.

2. The Relevant Technology

In a data communications environment, data is transferred between computing configurations, such as from a sender to a receiver, via a transmission medium during a dial-up session. Often times, a portion of the transmission medium is a phone line and the transfer requires the dialing of a numeric string of numbers at the sender's end in order to establish the connection. As this numeric string is used during dialing, it is sometimes referred to as a dialing string. The dial-up process becomes even more complicated when the sender's end is using a wireless transceiver attached to a modem to transfer the data. The wireless transmission medium may require additional alterations to the standard numeric dialing string.

A modem connection over a wireless network, particularly a cellular wireless network, is nearly unusable unless the modem on the other end of the connection is also using a wireless modem communication protocol. For example, when a user wants to request a wireless connection, the user generally connects their notebook computer, PDA, or other computing configuration to their wireless transceiver. Next the user develops a dialing string and dials the destination location. Once the user connects across the wireless network, error correction, special long delay timing, and signal shaping are required, especially with cellular analog transmissions. Typically, cellular transmissions will be considerably slower than the modem or transceiver's functional capability, leaving the user trying to transfer data at archaic data transfer rates. Similar problems arise in the digital realm with transmission delays and other error correcting protocols lowering the actual wireless connection rate from the peak data transfer rate, although not as dramatically as with cellular connections.

To solve this problem wireless service providers, particularly cellular service providers, often offer wireless computer users a more efficient means of transferring data. Namely wireless users are allowed to connect into the service providers modem pool before connecting with the wireless user's true destination location. The method of providing the end user with an optimal means of transmitting data is referred to within this application as providing enhanced services. Enhanced services often require the wireless user to add a dialing prefix like "*data" (*3282) or "#data" (#3282) to the original dialing string. Unfortunately, these enhanced service prefixes vary from location to location. For example, an appropriate enhanced services prefix in New York City, may not work in San Francisco. Often the wireless user must contact the service provider directly to obtain the necessary prefix information, which may be difficult if the wireless user is away from a familiar environment. Still other wireless areas do not yet offer enhanced services. What is needed is a system that can provide the wireless user with the appropriate dialing prefix to allow for an enhanced services connection when such a connection is available.

Access to these enhanced services is often only allowed after the appropriate billing information, such as an account number, is appended to the originally formulated dialing string. The fee-based enhanced services system may also request credit card numbers, pre-approved account numbers, or other means of direct electronic payment. The addition of all these numbers make it very difficult for the wireless user to make a high speed wireless connection. What is needed is a method and system that can create a dialing string capable of making a high speed connection, without substantial user intervention.

As previously described, under existing enhanced services systems a wireless user actually calls a service provider's modem pool and the service providers modem pool contacts the desired destination location. This method increases the connect rate substantially and enhances the users throughput creating a better overall experience for the user. Wireless transceiver networks have installed banks of modems to provide the service, but unfortunately they are difficult to find and connect to. There are a number of special requirements for dialing on various wireless networks, such as providing an encoded credit card number or personal identification number (PIN). Many of the access codes for enhanced services change based on the origination location of the wireless call and the service provider. What is needed is a method of providing these access codes in the dialing string without substantial user intervention.

Typically, a dialing string of numbers includes some or all of the following: a wireless data prefix like "*data" or "#data", extra digits required to dial from one country to another or to dial locally which could result, for example with a five-digit wireless data prefix; a seven-digit phone number; a thee-digit area code; a fourteen to sixteen-digit billing number; a delay or pause code for causing a delay between the phone number and billing information numbers, and any other numbers, such as "9," to access a line "outside" of the building or exchange in which the sender is located.

When the sender is dialing from a familiar environment, the actual dialing string used during a dial-up session is often programmed into computer memory and is usually dialed without incident. In an unfamiliar environment, as is generally the case with a wireless connection, the formulation or creation of the actual dialing string can often be quite problematic. For example, many times, the delay codes, the enhanced services prefix, the outside access line codes, etc., are unknown to the sender. As such, the sender must exercise trial and error methodologies until the communications link for transferring the data can be established. Adversely, this process requires valuable time and can result in failure to establish a connection, resulting in lost business.

While many foreign countries have implemented digital wireless systems and may therefore efficiently exchange digital data, non-digital systems such as analog (AMPS) systems are commonplace. In those areas which do allow wireless data transfers there are additional fees imposed on the wireless user. Billing information numbers, that affect the length and sequence of the dialing string, are often also implicated as senders are billed for data transfers when dialing from countries other than the credit cards' country of origin. As such, this can cause frustration to the wireless user and tremendously lengthen the time it takes to establish a communications link.

Prior approaches have been taken that attempt to assist users in overcoming the foregoing frustrations and problems. Such attempts have heretofore resulted in little more than a presentation of options to be selected by users to facilitate the dial-up session. An example of such an option includes choices provided to users such as whether the outside access line code is a numeral "9" or a "0" or a "1," etc. The users then fill in a blank with the appropriate numeral. This, however, presupposes the user's awareness of the appropriate numeral. This does little, if anything, to help users in actually creating or formulating the dialing string when the user is unaware of the numeric values that should be included. As can be imagined, this confusion is greatly enhanced when a variable wireless prefix for data transmissions is introduced into the dialing string. Previous attempts to solve this problem included requiring the user to insert the dialing prefix in dialing strings by hand at the application level. Under this approach, every laptop dialing application that required wireless connectivity would have to be changed at each new location from which it was used.

It would be an advance to provide an improved approach for assembling a dialing string capable of selecting enhanced data services. Additionally, once a dialing string is dialed and used to try and establish a connection between a sender and receiver for the transfer of data, prior art software cease to provide useful assistance thereafter. For example, if the dialing string fails to establish the connection necessary for the dial-up session, the user is not informed as to whether it was failure of the dialing string or whether it was some other reason. Likewise, troubleshooting assistance and procedures for overcoming the failed connection are absent. With a wireless connection, where signal strength and reliability may be a major issue, troubleshooting and follow-on assistance would be important.

Accordingly, it would be an advance to provide users with means for formulating or creating numeric dialing strings for the wireless transfer of data. It would also be an advance to provide follow-on assistance in the event of failure while users are attempting to establish the wireless communications link necessary to transfer the data.

SUMMARY AND OBJECTS OF THE INVENTION

It is therefore, an object of the present invention to provide means for creating numeric dialing strings facilitating a wireless dial-up session for the transfer of data between computing system configurations.

It is another object of the present invention to provide means for creating wireless numeric dialing strings for enhanced services dial-up sessions.

It is still another object of the present invention to provide means for creating wireless dialing strings when a wireless user is substantially unaware of the numeric values necessary to create a wireless dialing string prefix.

It is yet another object of the present invention to provide assistance and feedback to wireless users during the creation of wireless dialing strings.

It is still yet another object of the present invention to provide a means for indicating whether wireless dialing strings provide connection to a enhanced services modem pool for a given dial-up session.

It is a further object of the present invention to supply wireless user assistance when wireless dialing strings fail to establish enhanced services connections during a dial-up session.

It is an even further object of the present invention to provide methods and computer readable media for achieving the foregoing.

In accordance with the invention as embodied and broadly described herein, the foregoing and other objectives are achieved by providing methods and computer readable media for creating wireless communication network dialing strings. The wireless dialing strings are then used in a dial-up session to establish an enhanced services communications link for transferring data between computing configurations from an origination location over a wireless communication network to a destination location.

In a preferred embodiment, a computing configuration, designated as an origination location, receives a data transmission request. Upon finding an attached wireless transceiver, queries are made to determine geographic and site information of the origination and destination locations. Using information from this query, a local enhanced services database is searched for appropriate wireless dialing codes, such as wireless enhanced service codes, local site codes, regional city codes, outside access calling card codes, plus calling card information and any relevant information that corresponds to the service provider, geographic, and site information. These codes are then fashioned into the dialing string.

Preferably, a dial-up manager, operable in a variety of operating systems at the to origination location, serves to provide the functions of querying about the wireless service provider, geographic and site locations. The dial-up manager accomplishes this task by initiating searches of local and remote enhanced service databases and fashioning an enhanced services dialing string. The local enhanced service database in the preferred embodiment consists of two portions. The first portion is a look-up table having various location information associated with wireless numeric phone dialing codes, such as, wireless enhanced services prefixes, zip codes and area codes to help pin point geographic locations, site locations, regional locations and system identification (SID). The second portion of the local enhanced service database contains the wireless enhanced services access prefix and dialing string for a specific wireless service provider as indicated by the look-up table of the first portion. Updates for the look-up table could be made through updates via optical disk, magnetic disk, internet download, wireless connection, or other reasonable update means.

It is a feature of this invention that the dial-up manager also monitors the actual dialing of the dialing string to determine whether a communications link between the origination and destination locations is ever established. In the event the link is established, the dialing string is associated with the origination and destination locations to help remember what was necessary to get a successful connection the next time a connection fails. In the event that the link is not established, troubleshooting assistance is provided to enable the eventual establishment of the dial-up session. This troubleshooting assistance may involve querying the service provider?s database for updated enhanced service information, dialing a secondary enhanced services dialing string, redialing the original dialing string, attempting a normal wireless data connection without enhanced services, or requesting additional information about the origination location of the wireless data transfer. Yet another feature of the manager is an automated wireless dial feature that tries common varieties of wireless dial string prefixes for a given service provider and phone manufacturer until a successful connection is made.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

Reference will now be made in detail to the present preferred embodiment of the invention, an example of which is illustrated in the accompanying drawing.

DETAILED DESCRIPTION OF THE PREFERRED EMBODIMENTS

In the preferred embodiment, a wireless dialing string management system is created through a combination of modem hardware and firmware along with driver and host software. This wireless dialing string management system calls for implementation of dialing string manipulation at the operating system, driver or modem level. This focus on dialing string manipulation at a more fundamental level, ensures fewer user directed adjustments, greater coverage and solves several difficult problems in dialing string replication particularly in the area of wireless data transmission. The addition of a database used by a host to coordinate these dialing strings enhances the qualities of the invention by lessening the required involvement of the wireless user in characterizing the dialing string.

The purpose of the system, designated as the preferred embodiment, is the creation and addition of the enhanced services modem pool prefixes to the standard dialing string when a wireless transceiver has been detected. As previously explained, wireless connections, particularly cellular connections, are nearly unusable without both ends using a preferred cellular protocol in their respective modems. Only certain people at the respective wireless service providers know about the cellular modem banks and an even more limited group can explain to a customer how to connect to these cellular modem banks. As such, the development of a universal database containing these access codes dramatically improves the usefulness of the wireless dialing string management system.

Figure 1:
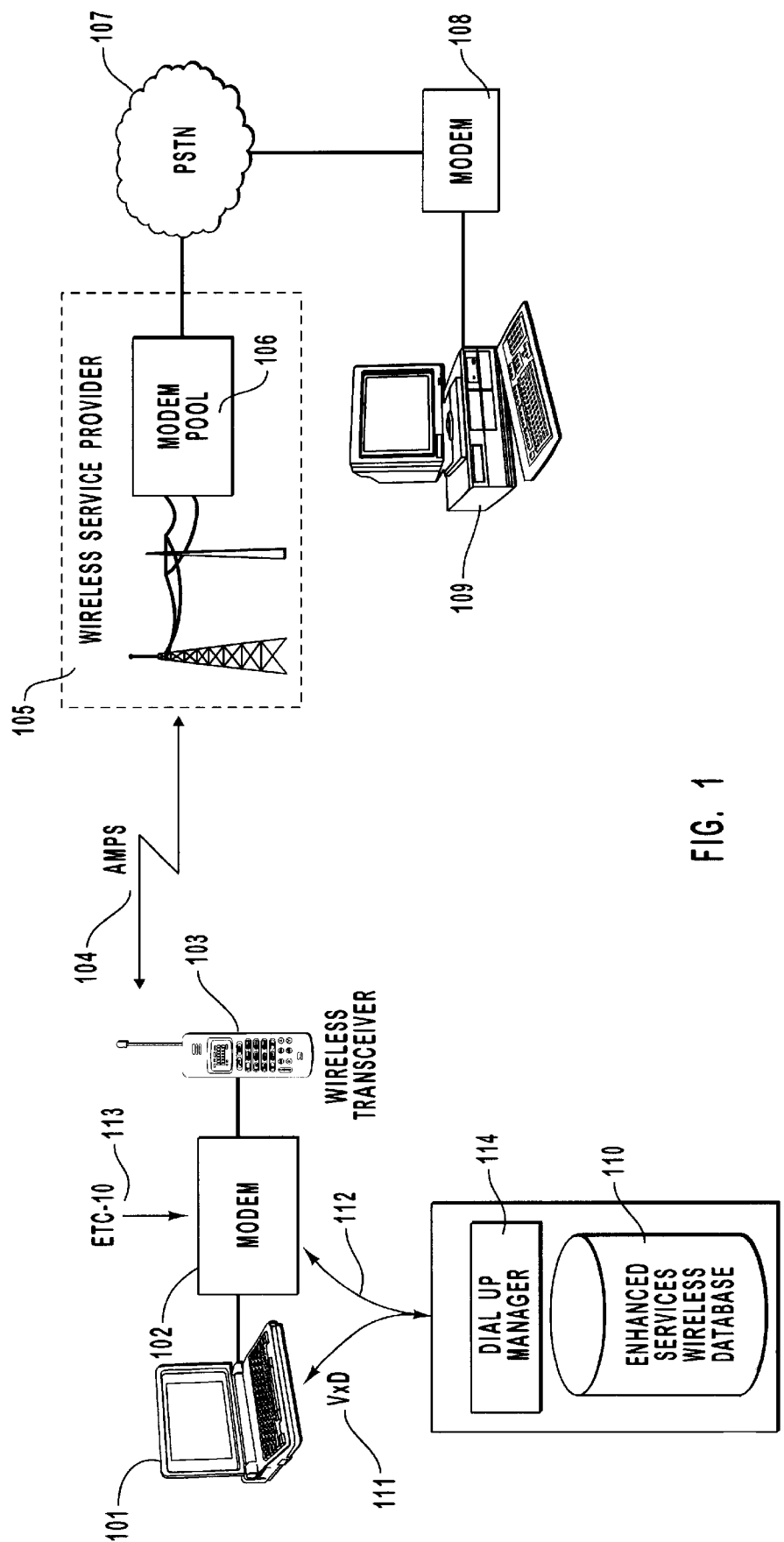
FIG. 1 depicts an exemplary enhanced services wireless data system that provides a suitable operating environment for a wireless user to complete wireless data transfer at a high transfer rate utilizing a wireless service provider's enhanced services wireless modem pool between an origination location and a destination location.

Reference is now made to FIG. 1 of the drawings, which is an exemplary enhanced services wireless data system that provides a suitable operating environment for a wireless user to complete wireless data transfer at a high transfer rate utilizing a wireless service provider's enhanced services wireless modem pool between an origination location and a destination location. A computer configuration designated as the origination location 101 is connected through a wireless data connection to a second computer configuration designated as the destination location 109. As part of this wireless connectivity environment the origination location 101 is attached to a modem 102 that is electrically connected to a wireless transceiver 103. The modem 102 may be a PCMCIA, external, integrated, internal modem, or may be integrated with the wireless transceiver 103. In the preferred embodiment, modem 102 either through hardware, firmware, or software performs like a cellular modem, utilizing a preferred wireless communication protocol 113 like ETC-10. The origination location 101 and the modem 102 interface with the enhanced services wireless database 110 in the following manner. A dial-up manager add number 114 controls access to and modification of the dialing string. In the preferred embodiment, the dial-up manager has a user interface component and a operating system component. A wireless user at the origination location 101 makes transmission requests through a user interface component of the invention. The software of the invention operates within the operating system component of the invention. In general, the operating system component comprises at least a dial-up manager, a driver, and a storage means. The operations, functions, and interrelationships of these devices are described in the following example.

In the preferred embodiment, when a wireless user requests a dial-up session, the dial-up manager is activated. In response to this request for a dial-up session, the dial-up manager responds with a plurality of queries regarding the preferred wireless service provider 105, the origination location 101 and the destination location 109. In response to the queries, the system either accesses automatic location routines to pinpoint the origination location or the system waits for the user to supply responses through various user input devices about the wireless services provider, the geographic, site, billing information, destination phone number, etc. Once the responses to the queries are known, the dial-up manager formulates a request packet 111 for passage to the storage means to search the enhanced services wireless database 110 in order to ascertain the codes corresponding to the responses. Determination of the various codes in this manner is preferably accomplished by various drivers via read/write commands or mechanisms. The request packet 111 is directed to the enhanced services wireless database 110 by, for example, drivers like the SERIAL.VxD. Exemplary VxD-type drivers are well known in the art and are described herein in detail. In general, these drivers more efficiently access the contents of the storage means by formulating the request packet into an appropriate format according to the function of various parameters employed by the present invention. Such parameters include but are not limited to, particular operating systems, particular storage means, whether the storage is remote or local, etc. Once the codes responsive to the request packet are ascertained, the dialing string codes 112 are passed back to the modem 102 or origination location 101 by the dial-up manager. Again, this may optionally include passage via the request packet 111 as directed by a driver means. Upon reception the dial-up manager formulates the codes into an appropriate dialing string and passes the dialing string back to the wireless user. Ultimately, this dialing string may be used to initiate a wireless data transfer between the origination location and the destination location during a wireless dial-up session.

The dialing string codes 112 provided to the user may comprise a hierarchy of dialing strings having a plurality of backup dialing strings and or a priority of usage. The formulation of the codes into a dialing string and the formulation of proper request packets for passage to the storage means for the searching of the storage means are performed by the dial-up manager as well as various other functions that are readily implemented by the foregoing description. For example, in providing queries to the user, the dial-up manager formulates the queries into a suitable format for display to a wireless user on a display device. Likewise, the dial-up manager is responsible for retrieving the queries and for receiving responses to the queries as indicated by the user via various user interface selection devices.

Once the dialing string is provided to the wireless user, the user may cause the dialing string to be dialed so that an actual communications link between the origination and destination locations can be established. A further advantage of the present invention over the prior art is the monitoring of attempts to establish a wireless communications link, so that in the event a connection is not established, troubleshooting assistance can be provided to the user. This is heretofore unknown to wireless dialing string management systems.

One embodiment calls for an initial dialing string to be created using standard communication software, like COTS, presently found on the computing configuration at the origination location 101. The communication software evaluates the necessary codes to be used between the origination location and the destination location, except for the wireless enhances services codes. As this destination dialing string is being prepared to be sent and when a wireless transceiver is detected, the wireless dial-up manager intercepts the destination dialing string and references the enhanced services wireless database 110 to determine whether the call is being initiated within an enhanced services area. If this query is positive, an enhanced services wireless modem pool 106 is available in the geographic location of the origination location 101. Upon determining the availability of a enhanced services wireless modem pool 106, the enhanced services wireless database 110 transmits the new dialing string codes 112 to the modem 102 via the dial-up manager. If the origination location 101 is within an enhanced services area, the modem 102 will be able to communicate with the enhanced services wireless modem pool 106 utilizing a preferred wireless communication protocol 113, such as ETC-10, to enhance the throughput of the wireless communication. Various wireless protocols can be utilized to take advantage of each of the individual wireless modem capabilities.

Once the dialing string codes 112 are provided to the modem 102, the wireless transceiver 103 is notified that a data transfer is ready to be made. Additionally, the dial-up manager may actually be able to determine the manufacturer of the service provider's wireless phone through the cellular phone cabling connection. The connection between the modem 102 and the wireless transceiver 103 may provide this information through a proprietary structure or connection. The structure and connection therefore provides information concerning which wireless service provider 105 is being used or at least which manufacturer of the wireless transceiver 103 is being used. This information is important as the enhanced services wireless database 110 may be referenced according to the service provider in the various geographic locations. Once the wireless transceiver 103 receives the enhanced services dialing string codes 112, it creates a wireless connection 104 with the wireless service provider 105. The wireless connection 104 for the preferred embodiment is an AMPS cellular connection. Although other methods of wireless transmission are considered to be within the scope of the present invention, AMPS exhibits the most dramatic increase in performance. These alternative wireless protocols are within the scope of the invention, particularly if a specialized modem bank or modem pool will increase the throughput of the wireless transmission. AMPS cellular, in particular, enjoys a dramatic increase in overall data transmission rate when connected to a cellular modem pool. In the absence of an enhanced services wireless modem pool, a cellular transceiver is limited to archaic data transmission rates to accommodate for error correction and signal shaping when connecting.

On the other end of the transmission, the wireless connection 104 is received by a wireless service provider 105. Wireless service providers 105 having enhanced services will divert cellular data transmissions to an enhanced services modem pool 106 for use by wireless data customers when so directed in the dialing string. The enhanced services modem pool 106 allows the wireless transceiver 103 of the wireless user to communicate using a preferred wireless communication protocol 113. The backend of the enhanced services modem pool 106 connects to the public switched telephone network (PSTN) 107. Once data reaches the PSTN 107 it can be transferred across land lines in a manner similar to standard phone data transfers. Specifically, the destination modem 108 will send and receive data from the PSTN 107, as if the destination modem 108 were communicating with another land line modem. The data is then converted by the destination modem 108 and transmitted to the computing configuration designated as the destination location 109. While the preferred embodiment only involves a wireless transmission on one side, a wireless transceiver could feasibly make a connection from the enhanced services wireless modem pool 106 across the wireless network to another wireless destination location. This configuration would not dramatically affect the management and manipulation of the dialing string at the origination location 101. If suffixes or prefixes were necessary to designate that the destination location 109 was also using a wireless connection, such additions could be added to the enhanced services wireless database 110.

Figure 2:
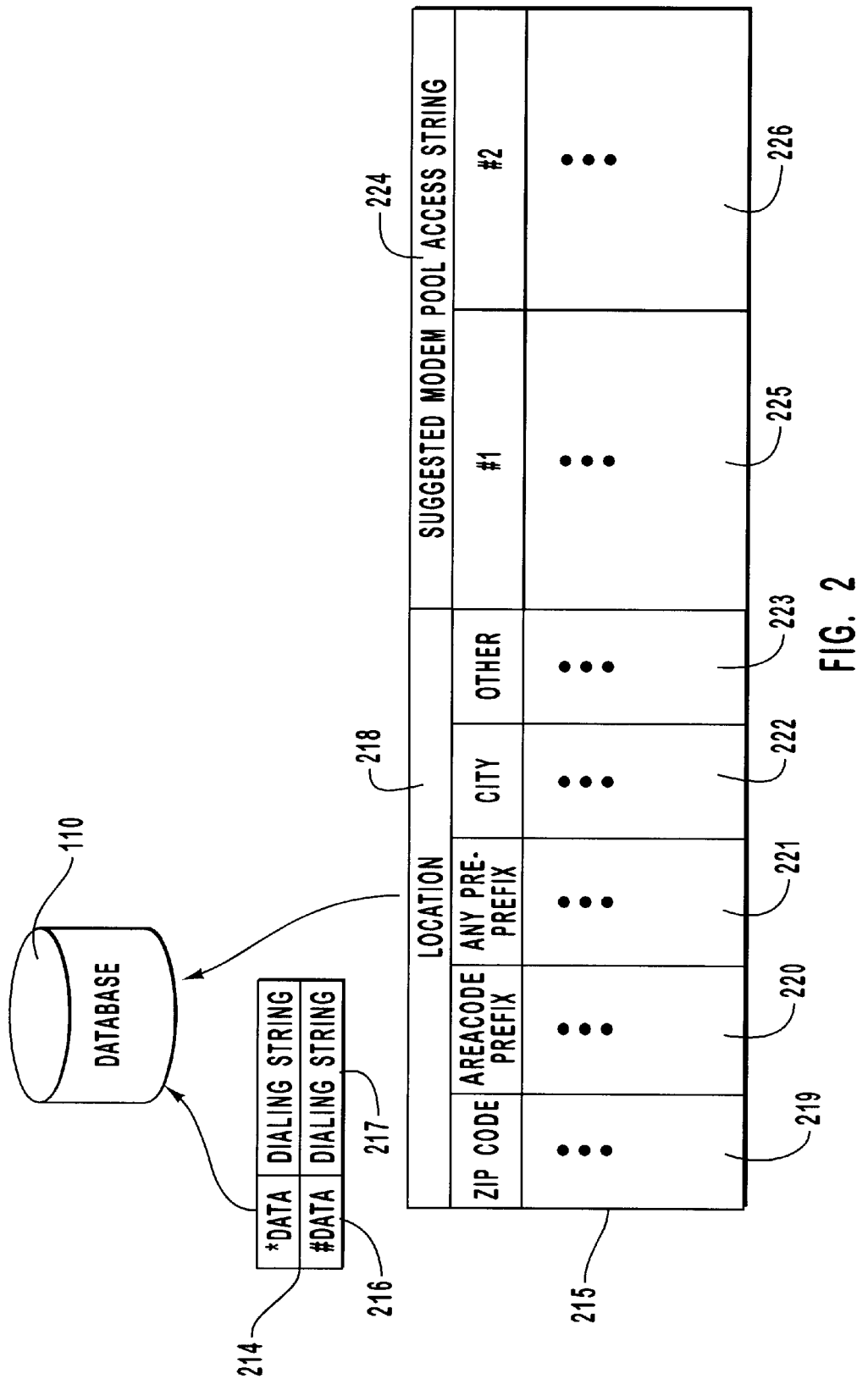
FIG. 2 is a diagram of an exemplary database architecture to be used at the origination location to help create a enhanced services dialing string.

FIG. 2 is a diagram of an exemplary database architecture to be used at the origination location to help in the creation of a enhanced services dialing string. The diagram illustrates how a look-up table 215 comprising location parameters 218 and suggested modem pool access strings 224 can be constructed so as to provide an easy method of obtaining a primary dialing string 225 and a secondary dialing string 226 for enhanced services for the computing configuration at the origination location 101. The enhanced services wireless database 110 includes, but is not limited to, a look-up table 215 having numeric phone dialing codes corresponding to various wireless service providers 105, zip code references 219, area code prefixes 220, site requirements 221, regional information 222, and various other indicia 223. The dial-up manager utilizes the request packet 111 to search the look-up table 215 with the information provided by the wireless user or automated location devices for an enhanced services location. Upon finding a matching group in the look-up table 215, hierarchial dialing string codes 112 are placed into enhanced services access table 214 comprising, a wireless data prefix 216 and a dialing string 217. These values are temporarily stored for reference by the dial-up manager in facilitating a connection for the user. The enhanced services access table 214 is also used by the dial-up manager in troubleshooting connection difficulties, because the table can provide the last successful enhanced services connection number.

Since the enhanced services wireless database 110 may be computer implemented, particular embodiments may range from computer executable instructions as part of computer readable media to hardware used in any or all of the following depicted structures. Still further embodiments may be combinations of hardware and computer executable instructions. When described in the context of computer readable media having computer executable instructions stored thereon, the enhanced services wireless database 110 denotes a data structure or series of instructions including program modules, routines, programs, objects, components, and data structures. Each perform particular tasks or implement particular aspects of the executable instructions. An exemplary data structure comprises instructions and data which cause a general purpose computer, special purpose computer, or special purpose processing device to perform certain functions or group of functions. The computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can be accessed by general purpose or special purpose computer. Combinations of the above should also be included within the scope of computer readable media.

The enhanced services wireless database 110 may be stored on a magnetic disk drive for reading from and writing to such as a hard disk. The magnetic disk drive for reading from or writing to may also employ a removable magnetic disk or an optical disk drive for reading from or writing to an optical disk drive such as a CD-ROM or other optical media. The hard disk drive, magnetic disk drive, and optical disk drive are connected to the system bus of the computation configuration at the origination location 101 through a hard disk drive interface, a magnetic disk drive interface, and an optical drive interface, respectively. The drives and their associated computer readable media provide a non-volatile storage of computer readable instructions, data structures, program modules, and other data for the computer. Although this exemplary dial-up manager employs a hard disk drive, a removable magnetic disk and a removable optical disk, it can be appreciated by those skilled in the art that other types of computer readable media which can store data accessible by a computer including magnetic cassettes, flash memory cards, digital video disks, removable disks, Bernoulli cartridges, random access memories (RAMs), read only memories (ROM), and the like. Other storage devices are also contemplated as being available to the enhanced services wireless database 110. Storage devices may comprise any number or type of storage media including, but not limited to, high end, high throughput magnetic disks, or one or more normal disks, optical disks, jukeboxes of optical disks, tape silos, and/or collections of tapes and/or storage devices that are stored off-line.

In another embodiment, the various storage devices may be partitioned into two categories. The first category is a local storage database that contains information that is locally available to computer systems and stored in non-volatile short term memory or magnetic memory. The second category is a remote storage database that includes any type of storage device that contains information that is not locally available to a computer system. While the line between these two data structures may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

Under this embodiment it is envisioned that the enhanced services wireless database may be composed of at least two data structures. Each wireless service provider may have a master remote storage database that can be accessed by the wireless user by dialing a remote access prefix and dialing string code for the remote storage database. In this embodiment, one could access these data prefix numbers to dial a preferred service provider's remote database and download the most recent local enhanced services database for the area in which the user plans to make wireless data transfers. Once contacted, a local copy of the enhanced services wireless database can be made allowing for a look-up table type data structure which allows a search to occur using at least one of the following location identifiers: zip code, area code, city, site information, GPS coordinates, or system I.D. (SID). All of these identifiers help to indicate the location of the origination location of the call. Once the area has been specified using the look-up table 215, a primary dialing string 225 and a secondary dialing string 226 are provided to the dial-up manager. Limitations can be made on the database such that the primary dialing string 225 must designate an enhanced services wireless modem bank. When the database is constructed in this manner a lack of a primary dialing string would indicated that enhanced services are not available in the area in question. Enhanced services in the preferred embodiment refers to providing wireless users with access to a wireless modem bank consisting of several cellular modems or a cellular modem pool. Other examples of enhanced services include, but are not limited to, expanded multi-bandwidth digital modems, E-mail and fax servers, globally available satellite modem banks, universal access modem banks, direct internet access through a high speed high throughput connection, or any other computer peripheral service which enhances the ability of a wireless user to conduct business and may be provided across a wireless connection.

Figure 3:
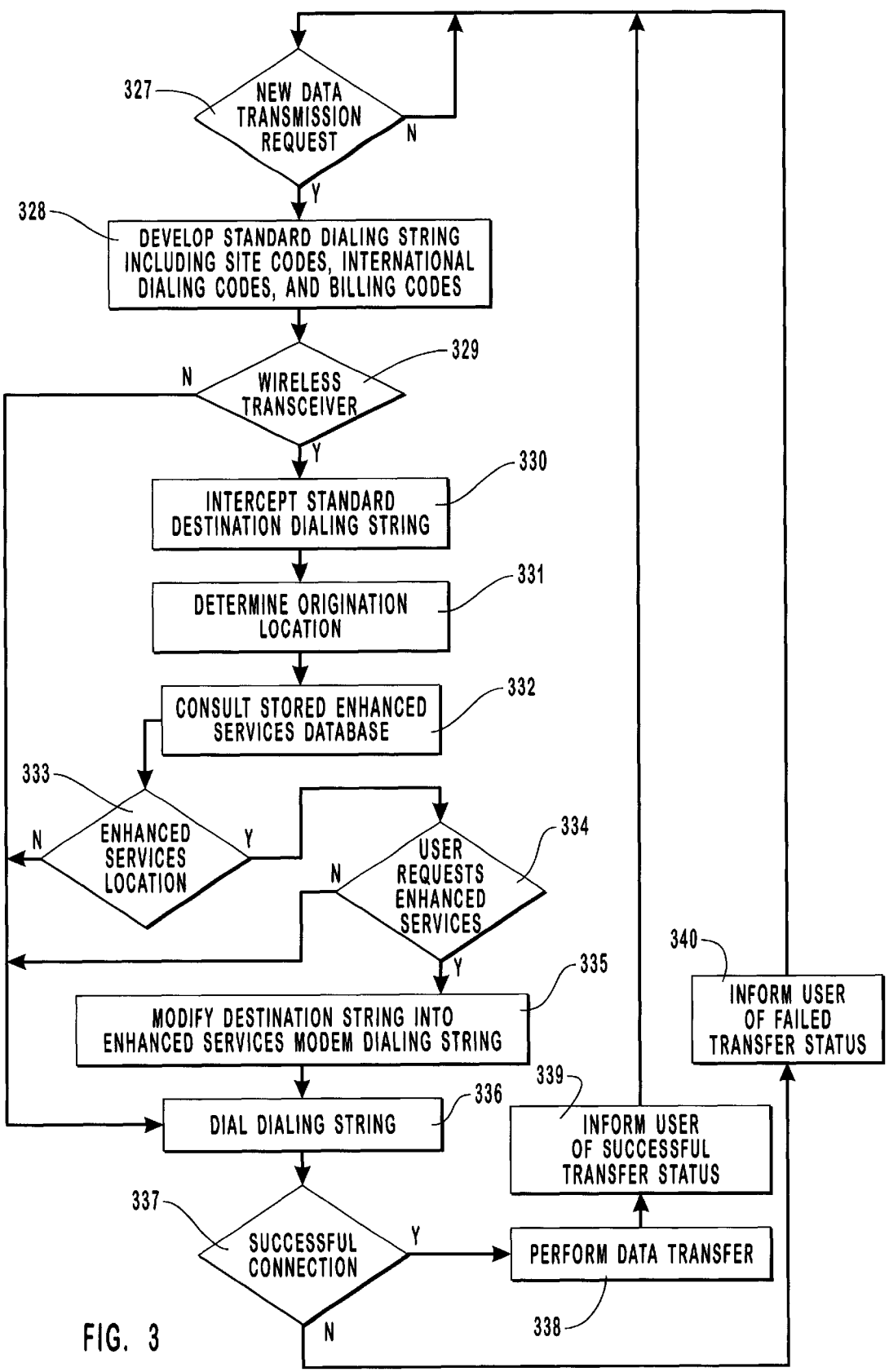
FIG. 3 is a flow chart illustrating the overall method for data transmission during a wireless dial-up session in accordance with the present invention.

Referring to FIG. 3, a flow chart illustrating the overall method for data transmission during a wireless dial-up session in accordance with the present invention. As previously described, a wireless dial-up session is where a user at one computing configuration designated as the origination location dials a dialing string to establish a communications link for data transmission to a second computing configuration designated as the destination location. In the preferred embodiment, a wireless transceiver is attached or integrated into the origination location. As the wireless transceiver is a cellular phone in the preferred embodiment, the user may need to utilize the enhanced services of the wireless service provider to connect with a cellular modem.

At step 327 a user requests or initiates a dial-up session for the purpose of making a new data transmission. This request can be performed in a variety of ways. For example, these sessions are presently requested by "clicking" an appropriate icon with a user interface device, such as a mouse, or by "pulling" down a menu and highlighting an appropriate menu item contained therein. Or the request can be made automatically as part of a software program. Still other request means are commonly known to one of skill in the art and should be included within this step.

At step 328, in response to the request for a dial-up session, the standard dial-up manager, develops a standard dialing string which includes individual site codes, international dialing codes, and various long-distance billing codes. To obtain this dialing string, a plurality of queries are made to ascertain essential information regarding the origination and destination locations. For example, queries are made regarding the geographic location of the origination location. Examples of geographic locations include, but are not limited to, the names of countries, continents, states, cities, regions, townships, area codes, zip codes, street addresses, etc. As distinguished for geographic locations, specific examples of sites include, but are not limited to, specific hotels, corporations, restaurants, or exact street addresses, or sites having unique requirements such as aircraft, ships, etc. Similar geographic and/or site location queries are made concerning the destination location. In this manner, these queries reveal specific information regarding how data is to be transferred during the dial-up session. Other inquiries include ascertaining billing information such as a credit card number, upon which a charge will accrue in the event that the dialing string is a long-distance phone call. Although not illustrated, it will be appreciated that still other queries include specific items such as actual phone number of the destination location or other referencing methods.

More specifically, the dial-up manager responds, at step 328, with a plurality of queries regarding the origination and destination locations. In response to the queries, the user responds, preferably through various user input devices, with information about the geographic, site, billing information, destination phone number, etc., to help create a standard destination dialing string. Once the responses to the queries are known, the dial-up manager formulates a request packet 111 for passage to the storage means to search a dial-up database in order to ascertain the codes corresponding to the responses. In a preferred embodiment, the database includes, but is not limited to, a look-up table having numeric phone dialing codes corresponding to various countries, regions, sites, etc. Specific examples of codes in the database preferably include codes such as the country codes, regional codes, site codes, delay codes, outside access line codes, etc. Determination of the dialing string codes 112 in this manner is preferable accomplished by various drivers via read/write commands or mechanisms. Drivers such as these are well known in the art and are not described herein in detail. In general, however, these drivers more efficiently access the contents of the storage means by formulating the request packet 111 into an appropriate format as a function of various parameters in which the present invention is employed. Such parameters include, but are not limited to, particular operating systems, particular storage means, whether the storage is remote or local, etc. Once the codes responsive to the request packet 111 are ascertained, the dialing string codes 112 are passed back to the dial-up manager. Again, this may optionally include passage via the driver means such as the SERJAL.VxD. Upon reception of the dialing string codes 112, the dial-up manager formulates the codes into an appropriate standard dialing string and passes the standard dialing string, back to the user. Ultimately, this standard dialing string will be used to transfer data between the origination and destination locations during a dial-up session. The standard dialing string provided to the user may comprise a hierarchy of dialing strings having a plurality of backup dialing strings and/or a preferred priority of usage. Aside from providing the querying, the formulation of the codes into a dialing string and the formulation of proper request packets for passage to the storage means for the searching of the storage means, various other functions are performed by the dial-up manager that are readily intimated by the foregoing description. For example, in providing queries to the user, the dial-up manager formulates the queries into a suitable format for display to a user on a display device. Likewise, the dial-up manager is responsible for retrieving the queries and for receiving response to the queries as indicated by the user via various user interface selection devices.

Once the queries have been made regarding the information of the origination and destination locations, an appropriate standard dialing string is provided to step 329. Step 329 determines whether there is a wireless transceiver attached to the modem. If no wireless transceiver is detected at step 329, the standard dialing string is presented to step 336 for dialing from the origination location to the destination location to initiate a dial-up session with the destination location.

Otherwise, following a positive identification of a wireless transceiver, step 330 intercepts the standard destination dialing string before it is used to make a call. Once the standard dialing string has been intercepted, step 331 reevaluates the origination location 101 to determine whether the origination location 101 is in a locality or area that is familiar to the computer. Generally, the geographic information surrounding the call has already been received in step 328, but if certain vital questions are lacking or were originally answered in a non-responsive fashion, the dial-up manager can query the user again regarding the unknown variables.

Once step 331 has determined the origination location 101, this information is passed to a enhanced services database. Step 332 consults the database look-up table to determine if the origination location is within an area possibly offering enhanced services and verifies the integrity of the database. If the database needs to be updated, the dial-up manager will warn the user about the status of the database and request an update be made. If the user is unable to update the database, the dial-up manager will attempt to user the old data on the assumption that access numbers are rarely eliminated, but are frequently added as coverage for enhanced services with individual service providers expands.

Step 333 compares the origination location with the areas stored in the enhanced services database to determine whether or not the origination location falls within an enhanced services area covered by the preferred wireless service provider. If not, the standard dialing string is passed by the dial-up manager to step 336. Upon a positive comparison, step 334 queries the user to determine whether or not enhanced services are desired. This query is necessary as enhanced services may increase the cost to the wireless user. The wireless user may also be dialing directly to a cellular modem, thus negating the need to utilize the enhanced services modem pool. A further reason to make this query is if in a previous attempt the user was some how unsuccessful in performing the data transfer and the wireless user is perhaps concerned that the enhanced services modem bank is not functioning properly. A negative response from the user results in the standard dialing string being passed on to step 336. Upon a positive response from the request in step 334, the dial-up manager will modify the standard destination string into an enhanced services modem dialing string. This modification is accomplished by the dial-up manager utilizing the dialing string codes 112 found in the enhanced services wireless database 110 in steps 332 and 333 to create the appropriate prefix and communicate the preferred wireless communication protocol 113 to the modem 102. Once the enhanced services modem dialing string has been created it is passed to step 336.

In step 336, the dialing string, whether enhanced or standard, is provided to the user via the dial-up manager. The dial-up manager under the direction of the user causes the dialing string to be dialed so that an actual communications link between the origination and destination locations can be established. As further advantage of the present invention over the prior art, the attempt to establish this communications link is monitored in step 337, so that in the event a connection is not established, troubleshooting assistance can be provided to the user in step 340. Should the connection be successfully created, step 338 performs the data transfer according to the type of connection made. This data transfer is monitored by the dial-up manager and upon successful completion of the transfer step 339 informs the user of a successful transfer and waits for a new data transmission request at step 327. If the connection is aborted or interrupted during the data transfer, step 337 would indicate that a connection was not successful and step 340 could provide troubleshooting assistance to the user. Troubleshooting may involve verifying the origination location, service provider, and the enhanced services wireless database information. It may also involve basic user friendly directions, such as querying about the power status for the wireless transceiver. Based on the troubleshooting dialogue, the dial-up manager can establish a set of parameters to retry the dialing process, or switch to the secondary dialing string 226 from the enhanced service wireless database 110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for creating an enhanced services dialing string for use in a transfer of digital data from an origination location to a destination location across a wireless channel, the steps comprising:

detecting a connection at said origination location to a wireless transceiver for said transfer;

upon detection of said connection, intercepting at said origination location a destination dialing string designating said destination location;

determining said origination location;

when said origination location corresponds to an enhanced services location within said wireless network, modifying said destination dialing string into said enhanced services modem dialing string for requesting access to a local modem pool; and providing enhanced services within said wireless channel.

2. The method according to claim 1, further comprising the step of designating a preferred wireless communication protocol wherein, said enhanced services modem dialing string further includes a preferred cellular protocol code.

3. The method according to claim 1, further comprising the step of determining a site of said origination location, said enhanced services modem dialing string comprising a code corresponding to said site.

4. A method for creating an enhanced services dialing string for use in a transfer of digital data from an origination location to a destination location across a wireless channel, the steps comprising:

detecting a connection at said origination location to a wireless transceiver for said transfer;

upon detection of said connection, intercepting at said origination location a destination dialing string designating said destination location;

determining said origination location;

when said origination location corresponds to an enhanced services location within said wireless network, modifying said destination dialing string into said enhanced services modem dialing string for requesting access to a local modem pool;

providing a hierarchy of enhanced services modem dialing strings, said hierarch having at least one primary and one secondary enhanced services modem dialing string; and providing enhanced services within said wireless channel.

5. The method according to claim 4, further comprising the step of dialing one of said enhanced services modem dialing strings of said hierarchy of enhanced services modem dialing strings to establish a wireless connection between said origination and destination locations.

6. The method according to claim 5, further comprising the step of monitoring said step of dialing to determine whether said connection is established.

7. The method according to claim 6, wherein if said connection is not established, either comprising the step of dialing another of said enhanced services modem dialing strings of said hierarchy of dialing strings.

8. A method for creating a dialing string to establish a dial-up session for transferring data from an origination location to a destination location in a wireless data communications environment, the steps comprising:

requesting said dial-up session;

before dialing said destination location, determining said origination and destination locations;

determining a site of said origination location;

determining a wireless provider from said origination location;

providing said origination location, said destination location, said site, and said billing information; and providing said dialing string, said dialing string having at least one: (i) code corresponding to said origination location; (ii) code corresponding to said destination location; (iii) outside access line code for dialing from said site; and (iv) delay code for pausing said dialing string before entering said billing information.

9. The method according to claim 8, wherein at least one of said steps of determining further comprises the step of passing a query from wireless modem database to a user at said origination location.

10. A method for creating a dialing string to establish a dial-up session for transferring data from an origination location to a destination location in a wireless data communications environment, the steps comprising:

requesting said dial-up session;

before dialing said destination location, determining said origination and destination locations;

determining a site of said origination location;

determining a wireless provider from said origination location;

providing said origination location, said destination location, said site, and said billing information;

providing a hierarchy of dialing strings, said hierarchy having at least one primary and one secondary dialing string, wherein said at least one primary dialing string designates an enhanced services wireless modem bank; and providing said dialing string, said dialing string having at least one: (i) code corresponding to said origination location; (ii) code corresponding to said destination location; (iii) outside access line code for dialing from said site; and (iv) delay code for pausing said dialing string before entering said billing information.

11. The method according to claim 10, further comprising the steps of dialing one of said dialing strings of said hierarchy to try and establish a wireless data connection between said origination location and said destination location.

12. The method according to claim 11, further comprising the steps of:

monitoring said step of dialing with a dial-up system manager; and in the event said on of said dialing strings fails to establish or maintain said wireless data connection, said dial-up system manager causing the step of dialing another of said dialing strings.

13. The method according to claim 8, wherein said step of providing said dialing string further comprises the steps of:

appending a special dialing prefix or suffix to said dialing string via the ATDT command; and directing said dialing string to a preferred wireless modem band according to said wireless service provider and said origination location.

14. In a computer system having a user interface including a display and a user interface selection device, a method for creating a dialing string for a digital data transfer using a wireless connection from an origination location to a destination location, the steps comprising:

retrieving a plurality of queries for said origination and destination location;

displaying said queries on said display;

receiving an indication from said user interface selection device in response to said queries, said indication providing each said origination location;

retrieving at least one code of said dialing string, said at least one code corresponding to said origination location;

retrieving at least one code of said dialing string, said at least one code corresponding to said destination location; and displaying said dialing string.

15. The method according to claim 14 wherein said step of displaying said dialing string further comprises the step of displaying a hierarchy of dialing strings, said hierarchy having at least one primary and one secondary dialing string.

16. The method according to claim 15 further comprising the steps of:

determining a wireless call context of the proposed wireless connection; and when said wireless call context corresponds to data transfer, dialing one of said dialing strings of said hierarchy of dialing strings to establish a wireless connection between said origination location and a wireless modem pool, wherein said wireless modem pool also establishes a connection with said destination location.

17. The method according to claim 14, wherein said step of retrieving further comprises the step of formulating a request packet containing said destination location for passage from a dial-up manager to a storage means.

18. The method according to claim 17, wherein said storage means comprises a look-up table, further comprising the step of searching said look-up table for a zip code or for an area code corresponding to said origination location.

19. A computer readable medium having a computer executable instructions for creating a dialing string to transfer data from an origination location to a destination location where a portion of the transfer occurs across a wireless network, comprising:

a database component for storing a plurality of wireless service providers, each said wireless service provider being associated with a plurality of geographic locations, each said geographic location being associated with a wireless modem pool availability code;

a user interface component for querying about a specific wireless service provider of said origination location, said specific wireless service provider being one of said plurality of wireless service providers;

a user interface component for querying about a specific geographic location of said origination location, said specific geographic location being one of said plurality of geographic locations; and a search component for searching said database component to determine one of said wireless modem pool availability code for said specific geographic location, said wireless modem pool availability code being used to form a portion of said dialing string.

20. The computer readable medium according to claim 19, wherein said wireless modem pool availability code contains a wireless access code if a wireless modem pool is available within said specific geographic location.

21. The computer readable medium according to claim 19, wherein said user interface component for querying about said specific wireless service provider automatically determines the specific wireless service provider through queries to an attached wireless phone through a wireless handset cable.

22. The computer readable medium according to claim 19, wherein said user interface component for querying about said specific geographic location automatically determines said origination location and changes protocol settings of a wireless modem driver to match the protocol settings used in said specific geographic location.

23. The computer readable medium according to claim 22, wherein said user interface component for querying about said specific geographic location obtains a System ID from an integrated modem/radio to obtain geographical settings from a local wireless database compatible with said database component.

24. The computer readable medium according to claim 19, wherein said search component further comprises a dial-up manager for formulating a request packet for passage between said database component, said request packet containing said specific wireless service provider and specific geographic locations.

* * * * *

UNITED STATES PATENT AND TRADEMARK OFFICE
CERTIFICATE OF CORRECTION

PATENT NO. : 6,317,597 B1
DATED : November 13, 2001
INVENTOR(S) : Jennifer Baker and John F. Major It is certified that error appears in the above-identified patent and that said Letters Patent is hereby corrected as shown below:

Column 3,
Line 62, before "enhanced" change "a" to -- an --

Column 4,
Line 27, before "origination" delete "to"
Line 58, after "service" change "provider?s" to -- provider's --

Column 5,
Line 7, after "order" change "that" to -- to illustrate --
Line 12, after "these" change "drawing" to -- drawings --

Column 10,
Line 35, after "would" change "indicated" to -- indicate --
Line 50, change "invention." to -- invention is shown. --

Column 11,
Line 46, before "accomplished" change "preferable" to -- preferably --

Column 14,
Line 32, before "comprising" change "either" to -- further --

Signed and Sealed this

Eleventh Day of June, 2002

Attest:

Attesting Officer

JAMES E. ROGAN
Director of the United States Patent and Trademark Office